(12) United States Patent
Khochbar et al.

(10) Patent No.: US 11,078,760 B2
(45) Date of Patent: Aug. 3, 2021

(54) DETERMINATION OF WELLBORE CONDITION

(71) Applicant: Chevron U.S.A. Inc., San Ramon, CA (US)

(72) Inventors: Namig Khochbar, Katy, TX (US); Raafat Z. Abbas, Katy, TX (US); Emre Doruk Tanyel, Houston, TX (US); Johan C. Delgado, Katy, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 150 days.

(21) Appl. No.: 16/521,227

(22) Filed: Jul. 24, 2019

(65) Prior Publication Data

US 2021/0025270 A1     Jan. 28, 2021

(51) Int. Cl.
*E21B 43/10*     (2006.01)
*E21B 47/00*     (2012.01)
*G01N 19/02*     (2006.01)
*E21B 37/00*     (2006.01)

(52) U.S. Cl.
CPC .............. *E21B 43/10* (2013.01); *E21B 37/00* (2013.01); *E21B 47/00* (2013.01); *G01N 19/02* (2013.01)

(58) Field of Classification Search
CPC .......... E21B 47/00; E21B 37/00; E21B 43/10; G01N 19/02
See application file for complete search history.

(56) References Cited

U.S. PATENT DOCUMENTS

| | | | |
|---|---|---|---|
| 2009/0216453 A1* | 8/2009 | Zaeper | E21B 31/03 702/6 |
| 2014/0196949 A1* | 7/2014 | Hareland | E21B 44/00 175/27 |
| 2019/0178059 A1* | 6/2019 | Zheng | E21B 41/0092 |
| 2020/0355063 A1* | 11/2020 | Van Vliet | E21B 47/07 |
| 2020/0370413 A1* | 11/2020 | Phillips | E21B 19/00 |

* cited by examiner

*Primary Examiner* — Brad Harcourt
(74) *Attorney, Agent, or Firm* — Esplin & Associates, PC

(57) ABSTRACT

Pullout information for a drilling tool may be obtained. The pullout information may characterize one or more operating characteristics of the drilling tool during pullout of the drilling tool from the wellbore. A pullout friction factor for the wellbore may be determined based on the pullout information. A comparison of the pullout friction factor to a pullout friction factor threshold may be performed to determine whether the pullout friction factor satisfies or violates the pullout friction factor threshold. The condition of the wellbore to run the casing into the wellbore may be determined based on whether the pullout friction factor satisfies or violates the pullout friction factor threshold.

20 Claims, 5 Drawing Sheets

DETERMINATION OF WELLBORE CONDITION

FIELD

The present disclosure relates generally to the field of determining condition of a wellbore to run a casing into the wellbore.

BACKGROUND

Condition of a wellbore must favorable to successfully run a casing into the wellbore. For example, a wellbore with insufficient cleanliness (not having enough drilled cuttings removed) may result in the casing becoming stuck and/or damaged before reaching the bottom of the wellbore. Consistent and accurate prediction of the wellbore condition (e.g., cleanliness, stability, tortuosity-borehole spiraling, trajectory profile-micro dogleg severity, pore pressure, formation type, pipe stiffness effect) would allow for running of a casing when the condition of the wellbore is favorable.

SUMMARY

This disclosure relates to determining condition of a wellbore. Pullout information for a drilling tool and/or other information may be obtained. The pullout information may characterize one or more operating characteristics of the drilling tool during pullout of the drilling tool from the wellbore. A pullout friction factor for the wellbore may be determined based on the pullout information and/or other information. A comparison of the pullout friction factor to a pullout friction factor threshold may be performed to determine whether the pullout friction factor satisfies or violates the pullout friction factor threshold. The condition of the wellbore to run the casing into the wellbore may be determined based on whether the pullout friction factor satisfies or violates the pullout friction factor threshold and/or other information.

A system that determines condition of a wellbore may include one or more electronic storage, one or more processors and/or other components. The electronic storage may store pullout information, information relating to a drilling tool, information relating to a wellbore, information relating to pullout of a drilling tool from a wellbore, relating to operating characteristic(s) of a drilling tool, information relating to pullout friction factor, information relating to pullout friction factor threshold, information relating to comparison of pullout friction factor to pullout friction factor threshold, information relating to a casing, information relating to condition of a wellbore to run a casing into the wellbore, and/or other information.

The processor(s) may be configured by machine-readable instructions. Executing the machine-readable instructions may cause the processor(s) to facilitate determining condition of a wellbore. The machine-readable instructions may include one or more computer program components. The computer program components may include one or more of a pullout information component, a pullout friction factor component, a comparison component, a condition component, and/or other computer program components.

The pullout information component may be configured to obtain pullout information for a drilling tool and/or other information. The pullout information may characterize one or more operating characteristics of the drilling tool during pullout of the drilling tool from the wellbore. In some implementations, the wellbore may include one or more lateral portions. In some implementations, the drilling tool may include a drill string. In some implementations, the operating characteristic(s) of the drilling tool may include a hookload of the drill string during pullout of the drill string from the lateral portion(s) of the wellbore.

The pullout friction factor component may be configured to determine a pullout friction factor for the wellbore based on the pullout information and/or other information. In some implementations, the pullout friction factor may be determined based on the hookload of the drill string and one or more physical properties of the drill string. In some implementations, the pullout friction factor may be determined based on a comparison of the hookload of the drill string to predicted hookloads of the drill string for different pullout friction factors as a function of depth.

The comparison component may be configured to perform a comparison of the pullout friction factor to a pullout friction factor threshold to determine whether the pullout friction factor satisfies or violates the pullout friction factor threshold. The comparison of the pullout friction factor may determine whether the pullout friction factor is above, below, is the same as, or within the pullout friction factor threshold. In some implementations, the pullout friction factor threshold may include a single value. In some implementations, the pullout friction factor threshold may include a range of values.

The condition component may be configured to determine the condition of the wellbore to run one or more casings into the wellbore based on whether the pullout friction factor satisfies or violates the pullout friction factor threshold and/or other information. In some implementations, running one or more casings into the wellbore may be effectuated responsive to the pullout friction factor satisfying the pullout friction factor threshold and/or other information. In some implementations, cleaning of the wellbore may be effectuated responsive to the pullout friction factor violating the pullout friction factor threshold and/or other information. In some implementations, cleaning of the wellbore may be performed by tripping into the wellbore and applying one or more wellbore-cleaning parameters.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to determining condition of a wellbore. The wellbore may be drilled for extraction of petrochemical fluid or fluid injection. The condition to run a casing into the wellbore may be determined. The methods and systems of the present disclosure may enable real-time evaluation of wellbore condition based on pullout characteristic of a drilling tool. Tripping load of a drilling tool during pullout of the wellbore may be used to determine a pullout friction factor for the wellbore. The pullout friction factor may be compared to a threshold to determine whether the condition of the wellbore is favorable to run the casing to the bottom of the wellbore.

Figure 1:
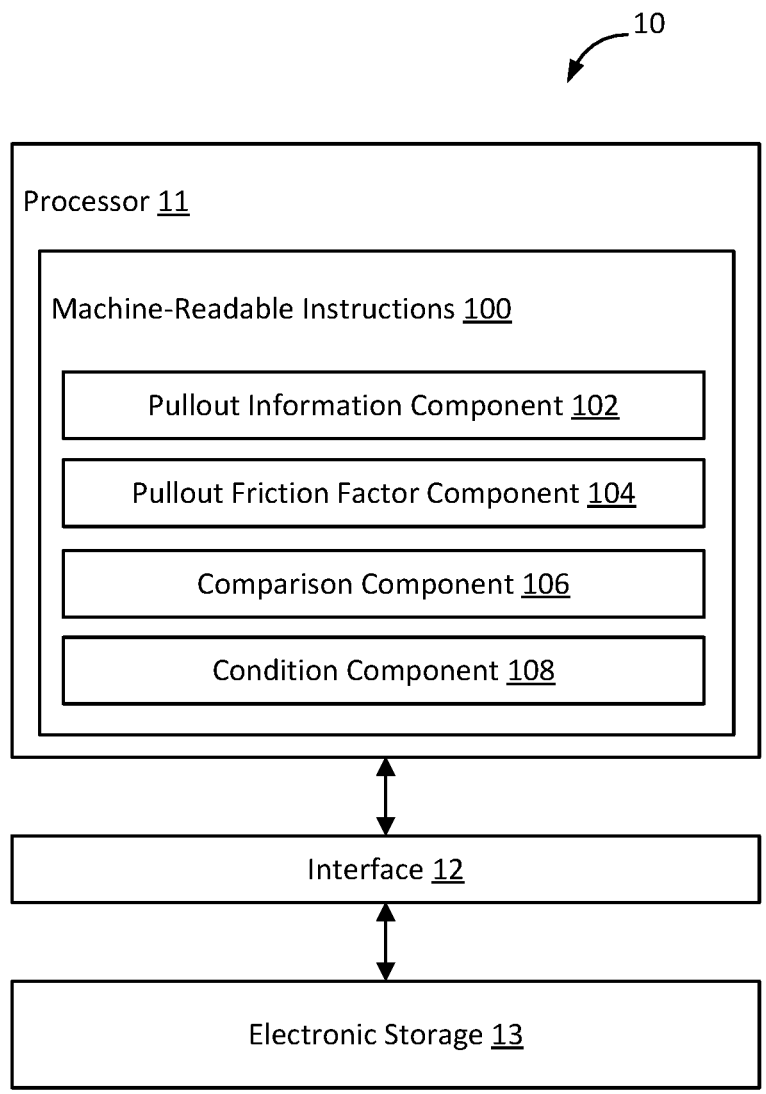
FIG. 1 illustrates an example system that determines condition of a wellbore.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Pullout information for a drilling tool and/or other information may be obtained by the processor 11. The pullout information may characterize one or more operating characteristics of the drilling tool during pullout of the drilling tool from the wellbore. A pullout friction factor for the wellbore may be determined by the processor 11 based on the pullout information and/or other information. A comparison of the pullout friction factor to a pullout friction factor threshold may be performed by the processor 11 to determine whether the pullout friction factor satisfies or violates the pullout friction factor threshold. The condition of the wellbore to run the casing into the wellbore may be determined by the processor 11 based on whether the pullout friction factor satisfies or violates the pullout friction factor threshold and/or other information.

A wellbore may refer to a hole that is drilled in the ground. The hole may be drilled in the ground for exploration and/or recovery of natural resources in the ground. For example, a wellbore may be drilled in the ground to aid in extraction of petrochemical fluid (e.g., oil, gas, petroleum, fossil fuel). As another example, the hole may be drilled in the ground for fluid injection. Application of the present disclosure to other types of holes and wellbores drilled for other purposes are contemplated.

A wellbore may include one or more vertical portions, one or more lateral portions, and/or other portions. A vertical portion (vertical section) of a wellbore may refer to a part of the wellbore that is drilled in a vertical direction or near vertical direction. A vertical portion of a wellbore may refer to a part of the wellbore that extends in a vertical direction or near vertical direction. A vertical direction may include a direction that is perpendicular to the horizon and/or the ground. A vertical portion of a wellbore being drilled or extending in near vertical direction may include the part of the wellbore deviating away from a line perpendicular to the horizon. A vertical portion of a wellbore being drilled or extending in near vertical direction may include the part of the wellbore being drilled or extending more in the vertical direction than in the lateral direction. For example, a vertical portion of a wellbore may have inclinations away from a line perpendicular to the horizon, such as 15 to 25 degrees or more.

Figure 3:
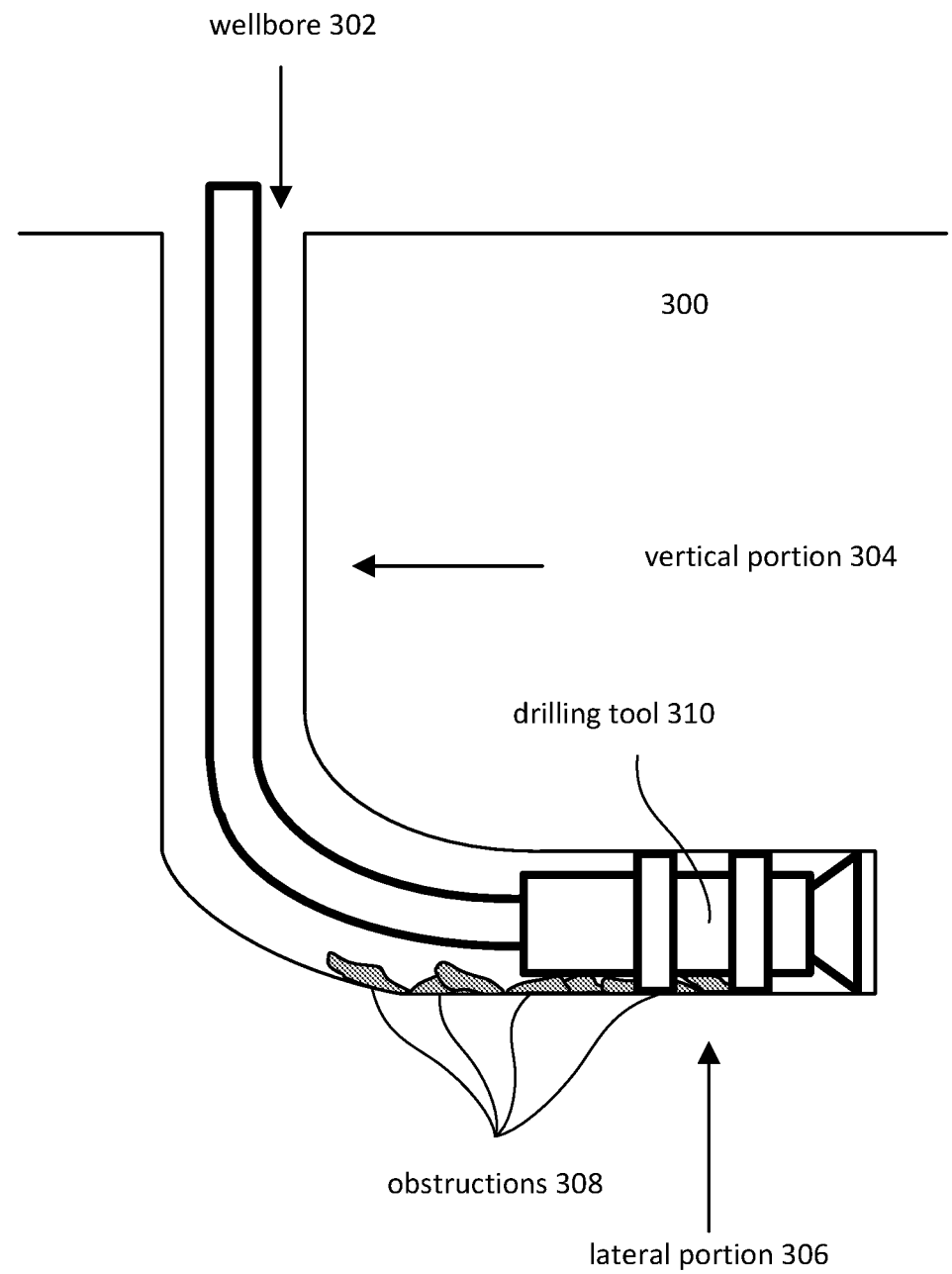
FIG. 3 illustrates an example wellbore.

A lateral portion (lateral section) of a wellbore may refer to a part of the wellbore that is drilled in a lateral direction or near lateral direction. A lateral portion of a wellbore may refer to a part of the wellbore that extends in a lateral direction or near lateral direction. A lateral direction may include a direction that is parallel to the horizon and/or the ground. A lateral portion of a wellbore being drilled or extending in near lateral direction may include the part of the wellbore deviating away from a line parallel to the horizon. A lateral portion of a wellbore being drilled or extending in near lateral direction may include the part of the wellbore being drilled or extending more in the lateral direction than in the vertical direction. For example, a lateral portion of a wellbore may have inclinations away from a line parallel to the horizon, such as 15 to 25 degrees or more. FIG. 3 illustrates an example wellbore 302. The wellbore 302 may be drilled into the ground 300 using a drilling tool 310. The wellbore 302 may include a vertical portion 304, a lateral portion 306, and/or other portions.

After drilling of a wellbore, a casing may be run into the wellbore. A casing may refer to a pipe that is set inside the wellbore to protect and/or support a wellstream. A casing may refer to a pipe that is set inside the wellbore to seal off fluids and/or to keep the wellbore from caving in. However, obstructions in the wellbore may prevent casing from being fully run in the wellbore. For example, drilled cuttings and/or other debris inside the wellbore may obstruct running of the casing into the wellbore and cause the casing to become stuck and/or damaged before reaching the bottom of the wellbore. Greater amount of obstructions may exist in lateral portion(s) of the wellbore than in vertical portion(s) of the wellbore. Thus, a casing may be more susceptible to becoming stuck and/or damaged in wellbores with long lateral portion(s).

For example, referring to FIG. 3, the drilling tool 310 may be used to drill the wellbore 302. After drilling, the drilling tool 310 may be pulled out of the wellbore 302 and a casing may be run into the wellbore 302. The movement of the casing into the wellbore 302 may be obstructed by obstructions 308, and the casing may become stuck and/or damaged in the wellbore 302 (e.g., in the lateral portion 306) before reaching the end or a target position within the wellbore 302.

If a casing becomes stuck in a wellbore, it may be necessary to pull the casing out from the wellbore and return with a drilling tool to perform one or more cleaning operations in the wellbore to improve condition in the wellbore for a successful casing run (e.g., remove obstructions in the wellbore). If the casing becomes damaged, it may be necessary to fix or replace the casing. Pulling the casing out, fixing/replacing the casing, and performing cleaning operation(s) may take a long time (e.g., days) and may be expensive.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store pullout information, information relating to a drilling tool, information relating to a wellbore, information relating to pullout of a drilling tool from a wellbore, relating to operating characteristic(s) of a drilling tool, information relating to pullout friction factor, information relating to pullout friction factor threshold, information relating to comparison of pullout friction factor to pullout friction factor threshold, information relating to a casing, information relating to condition of a wellbore to run a casing into the wellbore, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate determining condition of a wellbore. The machine-readable instructions 100 may include one or more computer program components. The machine-readable instructions 100 may include one or more of a pullout information component 102, a pullout friction factor component 104, a comparison component 106, a condition component 108, and/or other computer program components.

The pullout information component 102 may be configured to obtain pullout information for a drilling tool and/or other information. Obtaining pullout information may include one or more of accessing, acquiring, analyzing, determining, examining, identifying, loading, locating, opening, receiving, retrieving, reviewing, storing, utilizing, and/or otherwise obtaining the pullout information. The pullout information component 102 may obtain pullout information from one or more locations. For example, the pullout information component 102 may obtain pullout information from a storage location, such as the electronic storage 13, electronic storage of information and/or signals generated by one or more sensors monitoring operating characteristics of the drilling tool, electronic storage of information and/or signals generate by the drilling tool and/or one or more components of the drilling tool, electronic storage of a device accessible via a network, and/or other locations. Sensor(s) monitoring operating characteristics of the drilling tool may be part of, may be coupled to, and/or may be remote from the drilling tool. The pullout information component 102 may obtain pullout information from one or more hardware components (e.g., the drilling tool, a component of the drilling tool, a drilling tool sensor) and/or one or more software components (e.g., software running on a computing device). Pullout information may be stored within a single file or multiple files.

The pullout information may characterize one or more operating characteristics of the drilling tool during pullout of the drilling tool from a wellbore. Pullout of a drilling tool from a wellbore may include partial or full pullout of the drilling tool from the wellbore. A drilling tool may refer to a device or an implement designed and/or used for drilling. A drilling tool may be designed and/or used to drill one or more substances. For example, a drilling tool may include a rock drilling tool for drilling into and/or through rock (e.g., sedimentary rock). A drilling tool to may refer to one or more portions of a device/implement that performs the drilling. A drilling tool may refer to portions of or entirety of a device/implement that performs drilling. For example, a drilling tool may refer to one or more portions of a drilling rig, such as a drill string, one or more portions of the drill string (e.g., bottom home assembly, transition pipe, drill pipe), and/or other portion(s) of the drilling rig. In some implementations, a drilling tool may be used to perform one or more cleaning operations. Other drilling tools are contemplated.

The pullout information may characterize operation characteristic(s) of the drilling tool during pullout of the drilling tool from one or more portions of the wellbore. For example, a wellbore may include lateral portion(s), vertical portion(s), and/or other portion(s), and the pullout information may characterize operating characteristic(s) of the drilling tool (e.g., drill string) during pullout of the drilling tool from the lateral portion(s) of the wellbore, from the vertical portion(s) of the wellbore, and/or from other portions of the wellbore.

An operating characteristic of a drilling tool may refer to one or more features and/or one or more qualities of the drilling tool during operation. An operating characteristic of a drilling tool may include one or more values of operating parameter(s) that define the operation of the drilling tool. An operating characteristic of a drilling tool may include status of how a drilling component is being used (e.g., whether a component is being used, the translational and/or rotational direction of movement of a component). An operating characteristic of a drilling tool may include one or more conditions of the environment around and/or near the drilling tool. An operating characteristic of a drilling tool may include one or more values of environmental condition(s) and/or near the drilling tool.

For example, operating characteristic(s) of the drilling tool characterized by the pullout information may include hookload of the drilling tool as a function of the depth of the drilling tool. The pullout information characterizing the hookload of the drilling tool may include the pullout information defining measured values of the hookload of the drilling tool at different depths. The pullout information characterizing the hookload of the drilling tool may include the pullout information defining information from which the values of the hookload of the drilling tool at different depths may be calculated. Other operating characteristics of the drilling tool (e.g., drilling depth, total gas present, torque, rotation speed, weight on bit, pressure, flowrate) may be characterized by the pullout information.

For instance, the drilling tool may include a drill string and the wellbore may include one or more lateral portions. The operating characteristic(s) of the drilling tool characterized by the pullout information may include the hookload of the drill string during pullout of the drill string from the lateral portion(s) and/or other portions of the wellbore. The condition (e.g., cleanliness) of the wellbore may be evaluated based on the hookload of the drill string during pullout of the drill string from the lateral portion(s) and/or other portions of the wellbore, and/or other information.

The pullout friction factor component 104 may be configured to determine a pullout friction factor for the wellbore based on the pullout information and/or other information. A friction factor may refer to one or more values that represents amount of friction between the wellbore and the drilling tool. The values of the pullout friction factor for the wellbore determined based on the pullout information may represent amount of friction between the wellbore and the drilling tool (e.g., drill string) during pullout of the drilling tool from the wellbore. The pullout friction factor may be dependent on one or more physical properties of the drilling tool (e.g., shape of the drill string/portion(s) of the drill string, size of the drill string/portion (s) of the drill string, weight of the drill string/portion (s) of the drill string, material of the drilling string/portion (s) of the drill string), one or more conditions of the environment around and/or near the drilling tool (e.g., wellbore dimensions/schematics, conditions inside the wellbore, mud type, lubricity, tortuosity, pipe stiffness, pipe weight, drilled cutting concentration), and/or other drilling characteristics/conditions. For example, the pullout friction factor may be determined based on the hookload of the drill string (during pullout of the drill string from the wellbore), one or more physical properties of the drill string, one or more physical properties of the wellbore, and/or one or more fluid properties inside the wellbore.

In some implementations, the pullout friction factor may be determined based on a comparison of the hookload of the drilling tool (e.g., drill string) as a function of depth to predicted hookloads of the drilling tool as the function of depth for different pullout friction factors. Predicted hookloads of the drilling tool may be generated by one or more wellbore models. Inputs to a wellbore model may include information relating to one or more of wellbore profiles (e.g., surveys), wellbore schematics, drilling tool components, fluid inside wellbore, and/or drilling characteristics/conditions. Outputs of the wellbore model may include one or more predicted hookloads of the drilling tool and/or other outputs.

A wellbore model may simulate a physical system of pulling out a drilling tool from a wellbore for different pullout friction factors. For example, a wellbore model may simulate a physical system of pulling out a drill string from lateral portion(s) of the wellbore for different pullout friction factors. The pullout friction factor may be determined by comparing the measured hookload of the drilling tool to the predicted hookloads for different pullout friction factors.

Figure 4:
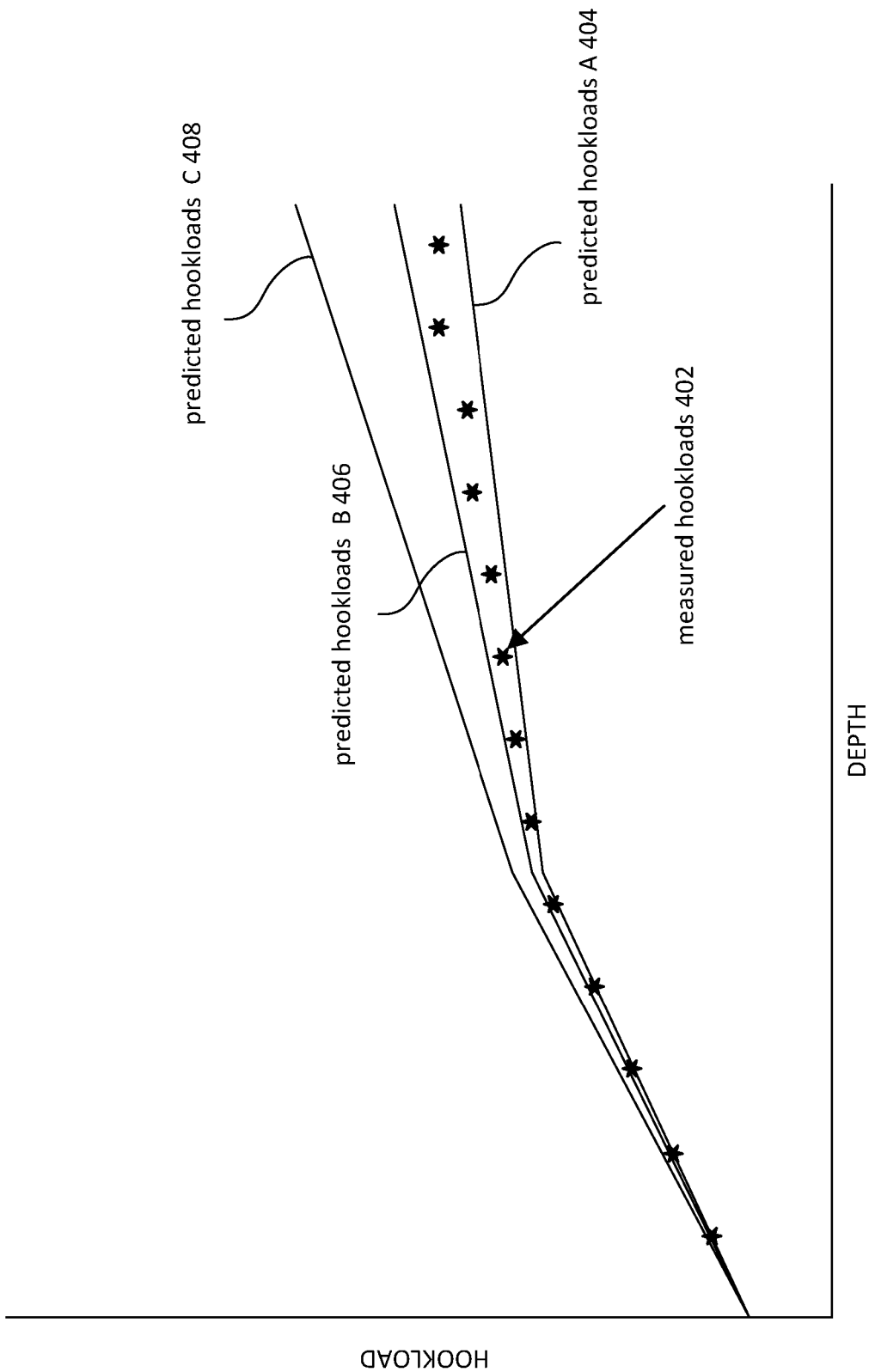
FIG. 4 illustrates an example comparison of measured hookloads with predicted hookloads.

For example, FIG. 4 illustrates an example comparison of measured hookloads 402 with predicted hookloads A 404, B 406, C 408. The measured hookloads 402 may include values of the hookload of a drilling tool (e.g., drill string) during pullout of the drilling tool from a wellbore (e.g., from lateral portion(s) of the wellbore, from vertical portion(s) of the wellbore). The predicted hookloads A 404, B 406, C 408 may include values of the hookload of the drilling tool predicted by one or more wellbore models based on different pullout friction factors of the wellbore.

For example, the predicted hookloads A 404 may include values of the hookload of the drilling tool predicted based on the pullout friction factor of the wellbore on being a specific value. The predicted hookloads B 406, C 408 may include values of the hookload of the drilling tool predicted based on the pullout friction factor of the wellbore on being different values. For example, three different pullout friction factors may be used to generate the predicted hookloads A 404, B 406, C 408, with the pullout friction factor used to generate the predicted hookload A 404 being the smallest value and the pullout friction factor used to generate the predicted hookload C 408 being the largest value. The comparison of measured hookloads 402 with predicted hookloads A 404, B 406, C 408 may be used to determine that the pullout friction factor for the wellbore is between the pullout friction factors used to generate the predicted hookload A 404 and the predicted hookload B 406.

In some implementations, one or more visualizations may be provided for the comparison of the hookload of the drilling tool to predicted hookloads of the drilling tool for different pullout friction factors as a function of depth. Such a visualization may include a plot of the measured hookload of the drilling tool and the predicted hookloads for different pullout friction factors as the function of depth (e.g., same as or similar to the comparison shown in FIG. 4). Other visualizations of the comparison of the hookload of the drilling tool to predicted hookloads of the drilling tool for different pullout friction factors are contemplated.

The comparison component 106 may be configured to perform a comparison of the pullout friction factor for the wellbore to a pullout friction factor threshold to determine whether the pullout friction factor satisfies or violates the pullout friction factor threshold. A pullout friction factor threshold may refer to one or more values that serve as a benchmark for comparison of the pullout friction factor for the wellbore. The pullout friction factor threshold may include a single value or a range of values (defined by maximum value, minimum value, and/or in-between values). The comparison of the pullout friction factor to the pullout friction factor threshold may include determination of whether the pullout friction factor is above, below, is the same as, or within the pullout friction factor threshold. The satisfaction/violation of the pullout friction factor threshold may be determined based on whether the pullout friction factor is above, below, is the same as, or within the pullout friction factor threshold.

For example, the pullout friction factor may satisfy the pullout friction factor threshold based on the pullout friction factor being below the pullout friction factor threshold. The pullout friction factor may violate the pullout friction factor threshold based on the pullout friction factor being above the pullout friction factor threshold.

In some implementations, the pullout friction factor may satisfy the pullout friction factor threshold based on the pullout friction factor being the same as or within the pullout friction factor threshold. For example, for a pullout friction factor threshold including a single value, the pullout friction factor may satisfy the pullout friction factor threshold based on the pullout friction factor being the same as the single value. For a pullout friction factor threshold including a range of values, the pullout friction factor may satisfy the pullout friction factor threshold based on the pullout friction factor being within the range of values.

In some implementations, the pullout friction factor may violate the pullout friction factor threshold based on the pullout friction factor being the same as or within the pullout friction factor threshold. For example, for a pullout friction factor threshold including a single value, the pullout friction factor may violate the pullout friction factor threshold based on the pullout friction factor being the same as the single value. For a pullout friction factor threshold including a range of values, the pullout friction factor may violate the pullout friction factor threshold based on the pullout friction factor being within the range of values.

In some implementations, the pullout friction factor may be determined to neither satisfy nor violate the pullout friction factor threshold based on the pullout friction factor being the same as or within the pullout friction factor. For example, for a pullout friction factor threshold including a single value, the pullout friction factor may neither satisfy nor violate the pullout friction factor threshold based on the pullout friction factor being the same as the single value. For a pullout friction factor threshold including a range of values, the pullout friction factor may neither satisfy nor violate the pullout friction factor threshold based on the pullout friction factor being within the range of values.

In some implementations, the pullout friction factor threshold may be determined based on historical information relating to pullout of drilling tools from wellbores and whether running of casings into the wellbores following the pullout of the drilling tools from the wellbores was successful or not successful. The historical information may include information on different instances in which a drilling tool was pulled out of a wellbore and whether or not a casing was successfully run into the wellbore (e.g., reached the end or a target position within the wellbore with intact casing integrity or without operational problems) following the pullout. The historical information may include information on operating characteristics of the drilling tool during pullout of the drilling tool from the wellbore, pullout friction factor for the wellbore, and running of the casing into the wellbore, such as the depth reached by the casing and/or whether or not the casing became stuck and/or damaged before reaching the end/target position within the wellbore and/or operational problems encountered during running of the casing.

The pullout friction factor of the wellbore may have empirical and consistent correlation to the condition of the wellbore (e.g., cleanliness of the wellbore, effectiveness of obstruction removal from the wellbore). The pullout friction factor of the wellbore and whether or not the casing was successfully run into the wellbore from the historical information may be used to determine the pullout friction factor threshold that separates wellbores with favorable condition to run casings from wellbores with unfavorable condition to run casings. The wellbores with favorable condition to run casings may generally have pullout friction factor lower than the pullout friction factor threshold and wellbores with unfavorable condition to run casings may generally have pullout friction factor higher than the pullout friction factor threshold.

Figure 5:
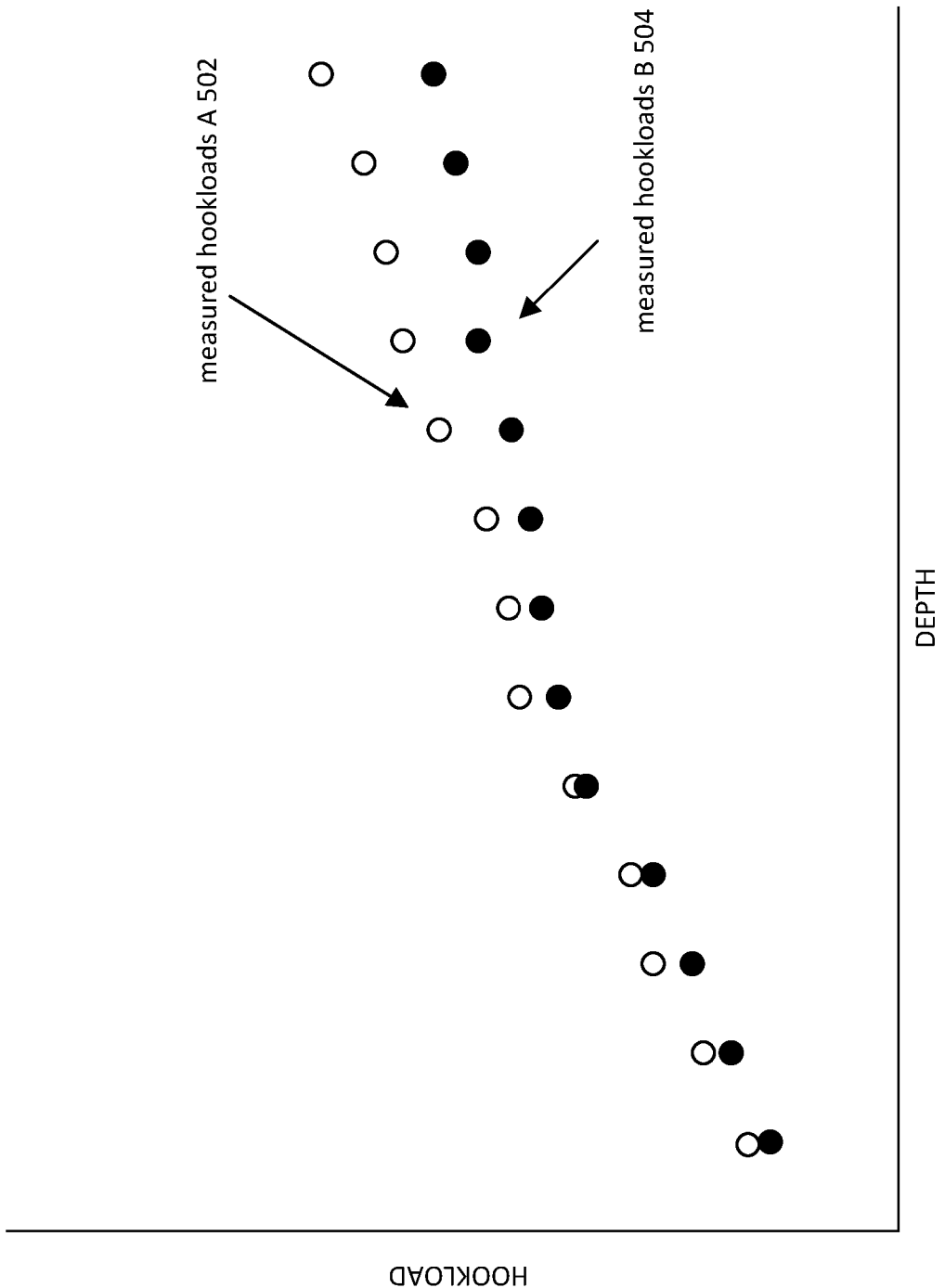
FIG. 5 illustrates example historical measurements of hookloads as a function of depth.

For example, FIG. 5 illustrates example historical measurements of hookloads as a function of depth. Measured hookloads A 502 may include values of the hookload of a drilling tool (e.g., drill string) during pullout of the drilling tool from a wellbore having a particular pullout friction factor. Measured hookloads B 504 may include values of the hookload of a drilling tool (e.g., drill string) during pullout of the drilling tool from a wellbore having a different pullout friction factor. The pullout friction factor of the wellbore corresponding to the measured hookloads A 502 may be larger than the pullout friction factor of the wellbore corresponding to the measured hookloads B 504.

A casing may have been run successfully into the wellbore in which the pullout of the drilling tool resulted in the measured hookloads B 504. That is, after the drilling tool was pulled out (experiencing the measured hookloads B 504 during the pullout), a casing may have been successfully run to the end/target position within the wellbore. A successful casing run may refer to running of the casing to a bottom/target position within the wellbore without operational problems and/or with an intact casing integrity (i.e., not damaged). A casing may have been run unsuccessfully into the wellbore in which the pullout of the drilling tool resulted in the measured hookloads A 502. That is, after the drilling tool was pulled out (experiencing the measured hookloads A 502 during the pullout), a casing may have been become stuck and/or damaged in the wellbore before reaching the end/target position within the wellbore.

The pullout friction factor threshold may be determined based on the measured hookloads A 502, B 504, the pullout friction factor of the corresponding wellbores, the depth reached by the casings, whether or not the casing was successfully run into the corresponding wellbores, and/or other information. For example, the pullout friction factor threshold may be determined to be lower than the pullout friction factor corresponding to the measured hookloads A 502 and higher than the pullout friction factor corresponding to the measured hookloads B 504. The pullout friction factor threshold may be used to determine (e.g., predict, estimate) whether condition of a wellbore is favorable to run a casing into the wellbore or whether remedial actions (e.g., cleaning) is necessary. For example, whether condition of a wellbore is favorable to run a casing into the wellbore or whether remedial actions is necessary may be determined based on whether the pullout friction factor of the wellbore satisfies or violates the pullout friction factor threshold.

In some implementations, the historical information may include information on pullout of same, similar, and/or comparable drilling tools from wellbores, information on pullout from same, similar, and/or comparable wellbores, information on pullout from same, similar, and/or comparable casings, and/or information on same, similar, and/or comparable drilling characteristics/conditions. Such historical information may be used to determine pullout friction factor threshold for drilling tools that are same, similar, and/or comparable to the drilling tools in the historical information, for wellbores that are same, similar, and/or comparable to the wellbores in the historical information, for casings that are same, similar, and/or comparable to the casings in the historical information and/or for drilling characteristics/conditions that are same, similar, and/or comparable to the drilling characteristics/conditions in the historical information.

In some implementations, the historical information may include information on pullout of different drilling tools from wellbores, information on pullout from different wellbores, information on pullout from different casings, and/or information on different drilling characteristics/conditions. Such historical information may be modified/normalized to account for differences in drilling tools, wellbores, casings, and/or drilling characteristics/conditions to determine pullout friction factor threshold for one or more drilling tools, for one or more wellbores, for one or more casings, and/or for one or more drilling characteristics/conditions. Such historical information may be used to modify/normalize pullout friction factor threshold to account for differences in drilling tools, wellbores, casings, and/or drilling characteristics/conditions to determine pullout friction factor threshold for one or more drilling tools, for one or more wellbores, for one or more casings, and/or for one or more drilling characteristics/conditions.

In some implementations, the pullout friction factor threshold may be modified based on the drilling tool, the wellbore, the casing, and/or the drilling characteristics/conditions corresponding to the pullout friction factor being compared to the pullout friction factor threshold. For example, the pullout friction factor threshold may be determined (based on the historical information) to include a value or a range of values for a particular drilling tool (e.g., of particular model, shape, size, weight, and/or material), a particular wellbore (e.g., having particular geometry, depth, location, surrounding material), a particular casing (e.g., of particular model, shape, size, weight, and/or material), and/or a particular set of drilling characteristics/conditions. The pullout friction factor threshold may be modified (increased, decreased) based on one or more differences between the particular drilling tool, the particular wellbore, the particular casing, and/or the particular set of drilling characteristics/conditions and the drilling tool, the wellbore, the casing, and/or the set of drilling characteristics/conditions corresponding to the pullout friction factor being compared. For instance, the casing that will be run into a wellbore may have different lengths/diameter and/or may be made out of different material than the particular casing of the pullout friction factor threshold. The pullout friction factor may be modified to account for the difference between the casing that will be run into the wellbore and the particular casing for which the pullout friction factor was determined. Other modifications of the pullout friction factor are contemplated.

The condition component 108 may be configured to determine the condition of the wellbore to run one or more casings into the wellbore based on whether the pullout friction factor satisfies or violates the pullout friction factor threshold and/or other information. Condition of a wellbore may refer to the state and/or circumstances affecting the wellbore for casing run and/or the state and/or circumstances affecting operations relating to running of a casing into the wellbore. For example, a wellbore with favorable condition may include obstructions (e.g., drilled cuttings, debris) having been sufficiently removed from the wellbore and/or the wellbore having sufficiently clear space to run the casing into the wellbore to the end or the target position within the wellbore. A wellbore with favorable condition may include the wellbore having a clean hole condition. A wellbore with unfavorable condition may include obstructions having been insufficiently removed from the wellbore and/or the wellbore having insufficiently clear space to run the casing into the wellbore to the end or the target position within the wellbore. A wellbore with unfavorable condition may include the wellbore not having a clean hole condition. Condition of the wellbore for successful running of the casing may be dependent on factors besides clean hole condition. Additional factors that may affect whether the condition of the wellbore is favorable or unfavorable for running of the casing may include wellbore stability, tortuosity-borehole spiraling, trajectory profile-micro dogleg severity, pore pressure, formation type, pipe stiffness effect, and/or other factors.

The condition component 108 may be configured to determine the condition of the wellbore to run one or more casings into the wellbore based on whether the pullout friction factor satisfies or violates the pullout friction factor threshold. The comparison of the pullout friction factor of the wellbore to the pullout friction factor threshold may be used to determine whether or not the condition of the wellbore (e.g., hole cleanliness, wellbore stability, tortuosity-borehole spiraling, trajectory profile-micro dogleg severity, pore pressure, formation type, pipe stiffness effect) is favorable to run the casing(s).

Use of the pullout friction factor threshold enables condition determination of the wellbore using comparison of exact value(s) (comparison of the pullout friction factor of the wellbore to the value(s) of the pullout friction factor threshold), rather than attempting to determine condition of the wellbore based on analyzing trends of drilling operations. The pullout friction factor threshold may be used as a success rate evaluation tool for running casing(s) into the wellbore. The rate of successfully running the casings into wellbores on first try may be increased by using the pullout friction factor threshold rather than using trend of drilling operations (e.g., increase success rate from 50% to 90%).

The pullout friction factor threshold may be used as a decision making tool in whether or not to run a casing into the wellbore. In some implementations, running of casing(s) into the wellbore may be effectuated by the condition component 108 responsive to the pullout friction factor satisfying the pullout friction factor threshold and/or other information. Effectuating running of a casing into a wellbore may include one or more of providing information that the condition of the wellbore is favorable to run the casing, starting one or more processes to run the casing into the wellbore, and/or other facilitation to run the casing into the wellbore. For example, based on the pullout friction factor satisfying the pullout friction factor threshold, a message may be provided to one or more users and/or one or more computing devices that the condition of the wellbore (e.g., clean hole) is favorable for a successful casing run. Based on the pullout friction factor satisfying the pullout friction factor threshold, a process to run the casing into the wellbore may be automatically started/run.

In some implementations, one or more remedial actions to improve the condition of the wellbore for a successful casing run may be effectuated by the condition component 108 responsive to the pullout friction factor violating the pullout friction factor threshold and/or other information. For example, cleaning of the wellbore may be effectuated by the condition component 108 responsive to the pullout friction factor violating the pullout friction factor threshold and/or other information. Effectuating cleaning of the wellbore may include one or more of providing information that the condition of the wellbore is unfavorable (e.g., insufficient cleanliness) to run the casing, starting one or more processes to clean the wellbore (e.g., reduce obstructions in the wellbore), and/or other facilitation to clean the wellbore. For example, based on the pullout friction factor violating the pullout friction factor threshold, a message may be provided to one or more users and/or one or more computing devices that the condition of the wellbore is unfavorable for a successful casing run. Based on the pullout friction factor violating the pullout friction factor threshold, a process to clean the wellbore may be automatically started/run. Cleaning of the wellbore may improve the condition of the wellbore to increase the likelihood of a successful casing run. The condition component 108 may effectuate one or more other remedial actions to improve the condition of the wellbore. For example, responsive to the pullout friction factor violating the pullout friction factor threshold, the condition component 108 may effectuate back-reaming the wellbore, increase in drilling fluid density (to address wellbore stability), and/or other remedial actions.

In some implementations, cleaning of the wellbore may be performed by tripping into the wellbore and applying one or more wellbore-cleaning parameters. Tripping into the wellbore may include running a drilling tool into and out of the wellbore. Tripping into the wellbore may remove obstructions (e.g., drill cuttings, debris) from the wellbore and improve condition of the wellbore by increasing clearance (e.g., cleanliness) of the wellbore. A wellbore-cleaning parameter may refer to a parameter applied and/or used for drilling and/or tripping into the wellbore. Examples of wellbore-cleaning parameter include one or more of mud properties, penetration rate, flow rate, pipe-rotation speed, tripping speed, drill properties, drillstring rotation, and/or other well-cleaning parameters.

In some implementations, further analysis of the condition of the wellbore may be effectuated by the condition component 108 responsive to the pullout friction factor neither satisfying nor violating the pullout friction factor threshold and/or other information. Effectuating further analysis of the condition of the wellbore may include one or more of providing information that the condition of the wellbore could not be determined (e.g., with acceptable degree of error), starting one or more processes to analyze the condition of the wellbore, and/or other facilitation to further analyze the condition of the wellbore. For example, based on the pullout friction factor neither satisfying nor violating the pullout friction factor threshold, a message may be provided to one or more users and/or one or more computing devices that the condition of the wellbore could not be sufficiently determined as being favorable or unfavorable to run the casing. Based on the pullout friction factor neither satisfying nor violating the pullout friction factor threshold, a process to further analyze the condition (e.g., cleanliness) of the wellbore may be automatically started/run.

In addition to indicating condition of the wellbore for a successful casing run, the pullout friction factor may indicate condition of the wellbore for a successful pullout of the drilling tool from the wellbore. In some implementations, the pullout friction factor for a wellbore may be determined during pullout of the drilling tool from the wellbore. The pullout friction factor for the wellbore may be monitored to determine when/whether the pullout of the drilling tool from the wellbore should be stopped/paused and one or more remedial actions should be performed to improve the condition of the wellbore. For example, the value of the pullout friction factor determined based on partial pullout of the drilling tool from the wellbore may indicate that the condition of the wellbore is unfavorable for a successful casing run and/or that the condition of the wellbore may result in unsuccessful pullout of the drilling tool (e.g., the drilling tool becoming stuck and/or damaged during pullout). In response, the pullout of the drilling tool from the wellbore may be stopped/paused and one or more remedial actions, such as cleaning of the wellbore, may be performed to improve the condition of the wellbore for a successful casing run and/or for successful pullout of the drilling tool.

For example, the pullout friction factor may be monitored during the pullout of the drilling tool from the wellbore and compared to a pullout friction factor threshold to determine whether the pullout friction factor satisfies or violates the pullout friction factor threshold. Responsive to the pullout friction factor violating the pullout friction factor threshold, the pullout of the drilling tool may be stopped/paused, and one or more remedial actions may be performed to improve the condition of the wellbore. Thus, the remedial action(s) to improve the condition of the wellbore may be performed before the drilling tool is fully pulled out of the wellbore.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
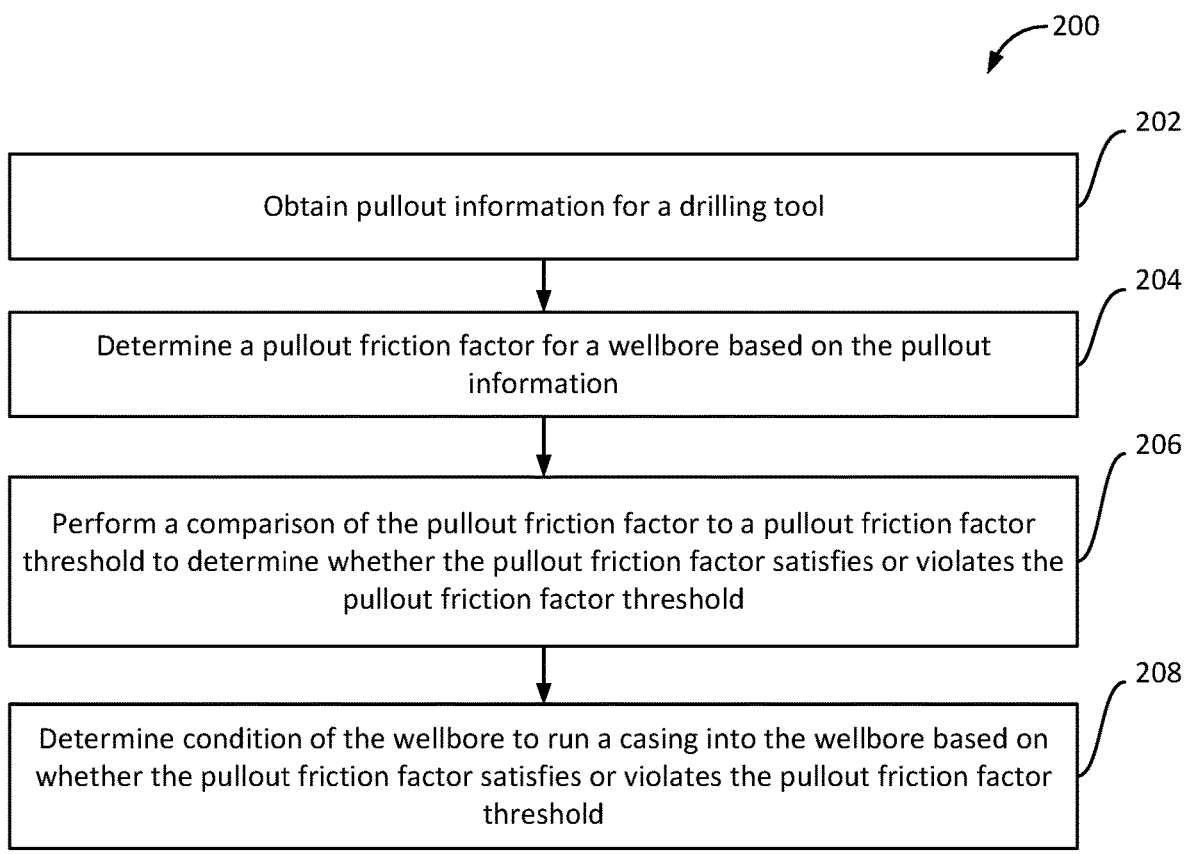
FIG. 2 illustrates an example method for determining condition of a wellbore.

FIG. 2 illustrates method 200 for determining condition of a wellbore. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, At operation 202, pullout information for a drilling tool and/or other information may be obtained. The pullout information may characterize one or more operating characteristics of the drilling tool during pullout of the drilling tool from a wellbore. In some implementation, operation 202 may be performed by a processor component the same as or similar to the pullout information component 102 (Shown in FIG. 1 and described herein).

At operation 204, a pullout friction factor for the wellbore may be determined based on the pullout information and/or other information. In some implementation, operation 204 may be performed by a processor component the same as or similar to the pullout friction factor component 104 (Shown in FIG. 1 and described herein).

At operation 206, a comparison of the pullout friction factor to a pullout friction factor threshold may be performed to determine whether the pullout friction factor satisfies or violates the pullout friction factor threshold. In some implementation, operation 206 may be performed by a processor component the same as or similar to the comparison component 106 (Shown in FIG. 1 and described herein).

At operation 208, condition of the wellbore to run a casing into the wellbore may be determined based on whether the pullout friction factor satisfies or violates the pullout friction factor threshold and/or other information. In some implementation, operation 208 may be performed by a processor component the same as or similar to the condition component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that determines condition of a wellbore to run a casing into the wellbore for extraction of petrochemical fluid or fluid injection, the system comprising:
   one or more physical processors configured by machine-readable instructions to:
   obtain pullout information for a drilling tool, the pullout information characterizing one or more operating characteristics of the drilling tool during pullout of the drilling tool from the wellbore;
   determine a pullout friction factor for the wellbore based on the pullout information;
   perform a comparison of the pullout friction factor to a pullout friction factor threshold to determine whether the pullout friction factor satisfies or violates the pullout friction factor threshold, the pullout friction factor threshold determined based on historical information on success of casing runs after drilling tool pullouts with different values of the pullout friction factor;
   determine the condition of the wellbore to run the casing into the wellbore based on whether the pullout friction factor satisfies or violates the pullout friction factor threshold; and
   responsive to the pullout friction factor satisfying the pullout friction factor threshold, effectuate running the casing into the wellbore.

2. The system of claim 1, wherein the one or more physical processors are further configured by the machine-readable instructions to:
   responsive to the pullout friction factor violating the pullout friction factor threshold, effectuate cleaning of the wellbore.

3. The system of claim 2, wherein cleaning of the wellbore is performed by tripping into the wellbore and applying one or more wellbore-cleaning parameters.

4. The system of claim 1, wherein the wellbore includes a lateral portion.

5. The system of claim 4, wherein the drilling tool includes a drill string.

6. The system of claim 5, wherein:
   the one or more operating characteristics of the drilling tool includes a curve of measured hookload of the drill string during pullout of the drill string from the lateral portion of the wellbore; and
   the determination of the pullout friction factor includes comparison of the curve of the measured hookload of the drilling tool during pullout of the drilling tool from the wellbore with curves of predicted hookload of the drilling tool during pullout of the drilling tool from the wellbore, separate ones of the curves of the predicted hookload generated based on separate values of the pullout friction factor, the curves of the predicted hookload including a first curve of the predicted hookload generated based on a first value of the pullout friction factor and a second curve of the predicted hookload generated based on a second value of the pullout friction factor, wherein a value of the pullout friction factor is determined to be between the first value and the second value based on the curve of the measured hookload falling between the first curve of the predicted hookload corresponding to the first value of the pullout friction factor and the second curve of the predicted hookload corresponding to the second value of the pullout friction factor.

7. The system of claim 6, wherein the pullout friction factor is determined further based on one or more physical properties of the drill string, the one or more physical properties of the drill string including one or more of shape, size, weight, and/or material of the drill string.

8. The system of claim 7, wherein the pullout friction factor is determined further based on one or more physical properties of the wellbore and one or more fluid properties inside the wellbore.

9. The system of claim 1, wherein the success of the casing runs is determined based on depth reached by the casing runs.

10. The system of claim 1, wherein the success of the casing runs is determined based on whether or not the casing runs experienced stuck casing or damaged casing before reaching a target position.

11. A method for determining condition of a wellbore to run a casing into the wellbore for extraction of petrochemical fluid or fluid injection, the method comprising:
obtaining pullout information for a drilling tool, the pullout information characterizing one or more operating characteristics of the drilling tool during pullout of the drilling tool from the wellbore;
determining a pullout friction factor for the wellbore based on the pullout information;
performing a comparison of the pullout friction factor to a pullout friction factor threshold to determine whether the pullout friction factor satisfies or violates the pullout friction factor threshold, the pullout friction factor threshold determined based on historical information on success of casing runs after drilling tool pullouts with different values of the pullout friction factor;
determining the condition of the wellbore to run the casing into the wellbore based on whether the pullout friction factor satisfies or violates the pullout friction factor threshold; and
responsive to the pullout friction factor satisfying the pullout friction factor threshold, effectuating running the casing into the wellbore.

12. The method of claim 11, further comprising:
responsive to the pullout friction factor violating the pullout friction factor threshold, effectuating cleaning of the wellbore.

13. The method of claim 12, wherein cleaning of the wellbore is performed by tripping into the wellbore and applying one or more wellbore-cleaning parameters.

14. The method of claim 11, wherein the wellbore includes a lateral portion.

15. The method of claim 14, wherein the drilling tool includes a drill string.

16. The method of claim 15, wherein:
the one or more operating characteristics of the drilling tool includes a curve of measured hookload of the drill string during pullout of the drill string from the lateral portion of the wellbore; and
the determination of the pullout friction factor includes comparison of the curve of the measured hookload of the drilling tool during pullout of the drilling tool from the wellbore with curves of predicted hookload of the drilling tool during pullout of the drilling tool from the wellbore, separate ones of the curves of the predicted hookload generated based on separate values of the pullout friction factor, the curves of the predicted hookload including a first curve of the predicted hookload generated based on a first value of the pullout friction factor and a second curve of the predicted hookload generated based on a second value of the pullout friction factor, wherein a value of the pullout friction factor is determined to be between the first value and the second value based on the curve of the measured hookload falling between the first curve of the predicted hookload corresponding to the first value of the pullout friction factor and the second curve of the predicted hookload corresponding to the second value of the pullout friction factor.

17. The method of claim 16, wherein the pullout friction factor is determined further based on one or more physical properties of the drill string, the one or more physical properties of the drill string including one or more of shape, size, weight, and/or material of the drill string.

18. The method of claim 17, wherein the pullout friction factor is determined further based on one or more physical properties of the wellbore and one or more fluid properties inside the wellbore.

19. The method of claim 11, wherein the success of the casing runs is determined based on depth reached by the casing runs.

20. The method of claim 11, wherein the success of the casing runs is determined based on whether or not the casing runs experienced stuck casing or damaged casing before reaching a target position.

* * * * *